United States Patent Office 3,277,151
Patented Oct. 4, 1966

3,277,151
(HYDROXYALKYLTHIO) ALKYL 2-METHOXY-3,6-DICHLOROBENZOATES
David P. Mayer, Chicago, Ill., assignor to Velsicol Chemical Corporation, a corporation of Illinois
No Drawing. Filed Dec. 26, 1962, Ser. No. 247,364
3 Claims. (Cl. 260—473)

This invention relates to the production of pesticidal compositions of matter. More specifically, this invention relates to new chemical compounds of the general formula

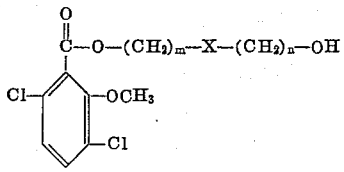

wherein X is selected from the group consisting of oxygen and sulfur and $m$ and $n$ are whole numbers from 2 to 6.

The new compounds of this invention have been found to have marked herbicidal activity and are useful for the control of undesirable plants. They are particularly valuable for this purpose because they are relatively water insoluble and are not readily washed down into the soil by rain and moisture. For this reason, they remain more closely in the weed control area and do not drift into areas where desirable woody plants such as trees may be affected.

The new compounds of this invention can be prepared by the reaction of 2 - methoxy - 3,6 - dichlorobenzoic acid with compounds $HO—(CH_2)_m—X—(CH_2)_n—OH$, wherein X, $m$, and $n$ are as defined above. It is preferred, however, that the reaction be carried out with the carboxylic acid in the form of its acid chloride, 2-methoxy-3,6-dichlorobenzoyl chloride.

Typical suitable reactants of the formula $$HO—(CH_2)_m—X—(CH_2)_n—OH$$

which will be called the glycols for brevity, are substances such as 2,2'-oxydiethanol (diethylene glycol), 3,3' - oxydipropanol, 4,4' - oxydibutanol, 6,6'-oxydi-1-hexanol, 2,2'-thiodiethanol, 3,3'-thiodipropanol, 4,4'-thiodibutanol, and the like.

Unsymmetrical glycols such as (2-hydroxyethylthio)-propanol and 6-(2-hydroxyethoxy)-1-hexanol can also be used. Preferred glycols for use in preparing the new compounds of this invention are those in which X is oxygen.

The reaction is ordinarily carried out with an excess of the glycol in order to favor the formation of the monoester rather than the diester. When the acid chloride is used as one of the reactants, it is also preferred to have an acid scavenger such as pyridine present to take up the hydrogen chloride formed during the reaction. Inert solvents can be used to facilitate the reaction if desired. The temperature at which the reaction is carried out is not critical, but temperatures at or below the normal reflux temperature of the reaction mixture are generally preferred. While the reaction is ordinarily carried out at normal atmospheric pressure, sub- or super-atmospheric pressures can also be used. The reaction product can be worked up and the product isolated by any of the recognized techniques known to the art, such as fractional distillation, crystallization, or chromatography.

The manner in which the new compounds of this invention can be prepared is illustrated in the following examples, in which all temperatures are in degrees centigrade.

EXAMPLE 1

*Preparation of 2-methoxy-3,6-dichlorobenzoyl chloride*

A mixture of 786 g. of finely powdered 2-methoxy-3,6-dichlorobenzoic acid and 1900 g. of thionyl choride was stirred and refluxed for 2 hrs. in a 5-liter flask protected with a drying tube. Most of the excess thionyl chloride was removed under reduced pressure over a steam bath. The residue was distilled in vacuo to give 770 g. (90.5% yield) of 2-methoxy-3,6-dichlorobenzoyl chloride, B.P. 81–86°/0.2–0.3 mm.

EXAMPLE 2

*Preparation of 2-(beta-hydroxyethoxy)ethyl 2-methoxy-3,6-dichlorobenzoate*

A mixture of diethylene glycol (636 g.; 6.0 moles) and pyridine (160 g.; 2.0 moles) was placed in a 2-liter flask and heated to 80° with stirring. 2-methoxy-3,6-dichlorobenzoyl chloride (480 g.; 2.0 moles) was then added dropwise over a period of 5 hrs. while the temperature of the reaction mixture was maintained at 80–90°. The mixture was heated at 100° for another 2 hrs., cooled to room temperature, and divided into two equal portions. Each portion was treated with a mixture of 250 ml. of water and 250 ml. of ether and shaken. The ether was separated, and the aqueous portion was extracted with two 100-ml. portions of ether. The combined ether portions were washed in order with water, 250 ml. of 10% NaOH, and water, dried over magnesium sulfate, filtered, and evaporated on the steam bath. The residue was distilled in vacuo to give 419 g. (67% of theory) of 2-(beta-hydroxyethoxy)ethyl 2 - methoxy - 3, 6 -dichlorobenzoate, B.P. 175–180°/0.2–0.4 mm.

Analysis for $C_{12}H_{14}Cl_2O_5$: Theory, percent C, 46.62; H, 4.56; Cl, 22.94. Found, percent C, 46.18; H, 4.84; Cl, 22.52.

A wide variety of other compounds within the scope of this invention can be prepared in a manner similar to that detailed above. In the following examples are given the starting materials which can be used to react with 2 - methoxy - 3,6 - dichlorobenzoyl chloride (identified for brevity as A) to give the indicated named compounds of this invention.

EXAMPLE 3

2,2' - thiodiethanol+A=2 - (beta - hydroxyethylthio)-ethyl 2-methoxy-3,6-dichlorobenzoate.

EXAMPLE 4

3,3' - oxydipropanol+A=3-(gamma-hydroxypropoxy)-propyl 2-methoxy-3,6-dichlorobenzoate.

EXAMPLE 5

3,3' - thiodipropanol+A=3 - (gamma-hydroxypropylthio)propyl 2-methoxy-3,6-dichlorobenzoate.

EXAMPLE 6

4,4' - oxydibutanol+A=4-(delta-hydroxybutoxy)butyl 2-methoxy-3,6-dichlorobenzoate.

EXAMPLE 7

4,4' - thiodibutanol+A=4 - (delta-hydroxybutylthio)-butyl 2-methoxy-3,6-dichlorobenzoate.

EXAMPLE 8

6,6' - oxydihexanol+A=6 - (zeta-hydroxyhexyloxy)-hexyl 2-methoxy-3,6-dichlorobenzoate.

EXAMPLE 9

6-(2-hydroxyethoxy)-1-hexanol+A=A mixture of 6-(beta - hydroxyethoxy)hexyl 2-methoxy-3,6-dichlorobenzoate and 2-(zeta-hydroxyhexyloxy)ethyl 2-methoxy-3,6-dichlorobenzoate.

For practical use as herbicides, the compounds of this invention are generally incorporated into herbicidal compositions which comprise an inert carrier and a herbicidally toxic amount of such a compound. Often these compositions will comprise a major amount of an inert carrier and a herbicidally toxic amount of a compound of this invention. Such herbicidal compositions, which can be called formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

EXAMPLE 10

*Preparation of a dust*

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are subsequently observed for percent kill, injury, and stand reduction. The results indicate a high order of herbicidal activity of the compounds of this invention. Comparable pre-planting or post-emergence tests can also be used.

What is claimed is:

1. A compound of the general formula

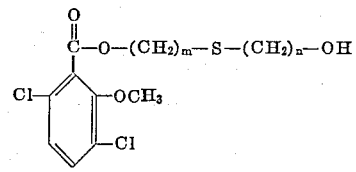

wherein $m$ and $n$ are whole numbers from 2 to 6.

2. 2-(beta-hydroxyethylthio)ethyl 2-methoxy-3,6-dichlorobenzoate.

3. 3-(gamma-hydroxypropylthio)propyl 2-methoxy-3,6-dichlorobenzoate.

References Cited by the Examiner

UNITED STATES PATENTS

| | | | |
|---|---|---|---|
| 2,396,513 | 11/1946 | Jones | 260—473 X |
| 2,594,135 | 4/1952 | Denny | 71—2.1 |
| 2,720,451 | 10/1955 | Anderson et al. | 71—2.1 |
| 2,726,947 | 12/1955 | Baumgartner | 260—476 X |
| 2,917,534 | 12/1959 | Sims et al. | 71—2.6 X |
| 3,013,054 | 12/1961 | Richter | 260—473 |
| 3,013,055 | 12/1961 | Richter | 260—473 |
| 3,013,058 | 12/1961 | Richter | 260—473 X |
| 3,091,630 | 5/1963 | Davis | 260—473 |

LORRAINE A. WEINBERGER, *Primary Examiner.*

LEON ZITVER, *Examiner.*

M. S. JAROSZ, S. B. WILLIAMS, *Assistant Examiners.*